United States Patent [19]
Brown

[11] Patent Number: 4,760,859
[45] Date of Patent: Aug. 2, 1988

[54] MODULAR PRESSURE INSTRUMENT

[75] Inventor: Gregory C. Brown, Minnetonka, Minn.

[73] Assignee: Rosemount Inc., Eden Prairie, Minn.

[21] Appl. No.: 52,018

[22] Filed: May 18, 1987

[51] Int. Cl.[4] .............................................. G05D 16/00
[52] U.S. Cl. ...................................... 137/84; 137/884; 137/454.2; 92/5 R
[58] Field of Search ....................... 137/84, 884, 454.2; 92/5 R; 200/83 S, 83 SA, 83 R, 83 A; 251/367; 73/861.47, 717; 192/107 M

[56] References Cited

U.S. PATENT DOCUMENTS

| | | | |
|---|---|---|---|
| 3,935,875 | 2/1976 | Hardin | 137/84 |
| 4,248,263 | 2/1981 | Langill | 137/454.2 |

Primary Examiner—Alan Cohan
Attorney, Agent, or Firm—Kinney & Lange

[57] ABSTRACT

A modular transmitter has an outer housing with a wall forming an interior cavity in which a control module is inserted. The wall has one or more ports therein that are connected to pressure conduits. When the control module is fully seated, the ports align with internal passageways in the control module that lead to control components in the control module. The control module further has an electrical circuit supported on an end thereof that is toward the inner end of the cavity when the control module is inserted and the circuit has components that removably mate with further elements mounted on the end wall of the cavity. These connections may include electrical contacts, and also rotationally adjustable components that have set points and which are coupled to set point adjustment and control shafts that are accessible from the opposite side of the end wall from the cavity. The coupling to the rotatable shafts permits not only rotationally driving the circuit components, but also accommodates some offset or misalignment between the two parts. Preferably, the coupling is a hook and loop type fastener that has two portions which can be separated in an axial direction, and will easily recouple for driving.

17 Claims, 3 Drawing Sheets

MODULAR PRESSURE INSTRUMENT

BACKGROUND OF THE INVENTION

1. Field of the Invention

The present invention relates to a pressure instrument that has a control assembly placed into an explosion proof housing and easily coupled and uncoupled from components in the housing, including drive connections for rotary controls.

2. Description of the Prior Art

Various pressure instruments such as current-to-pressure converters and pressure transmitters have been advanced in the art, and some have modular construction. However, having a modular functional assembly that can be removed for cleaning, service or replacement without disrupting the set points of rotatable potentiometers such as for span or zeroing, has been a problem. Because these adjustments have to be accessible under an easily removable cover and the circuit components have to be in a flame-proof compartment or cavity in many installations, the adjustment drive components have to be accessible on the exterior of a wall forming the cavity while the circuit components driven by the adjustment drive components are on the interior of the cavity. End users desire units which are easily repaired. Yet if the circuit assembly is removed from the housing cavity to be cleaned or for minor repairs, reconnection of the drive and driven components has been difficult because of alignment differences.

SUMMARY OF THE INVENTION

The present invention relates to a modular pressure instrument which includes an outer housing that has an interior cavity for mounting a control assembly or module including a circuit board with rotatably adjustable components that can be coupled and uncoupled from adjustment shafts accessible from the exterior, without precise alignment either rotationally or axially. As shown, the cavity, in the housing for receiving the control module is accessible from one end, and the other end of the cavity is closed by an end wall. The end wall outer surface is accessible from the exterior for attaching electrical leads and also for accessibility to adjustment shafts for span and zero potentiometers. The cavity is designed to receive and support a control assembly or module which includes fluid pressure active elements for sensing or for control, and circuitry for processing signals related to control module operations.

An explosion-proof housing, preferably, is formed and the control elements, such as the zero and span adjustment shafts, are releasably coupled to potentiometers on the interior of the housing cavity through coupling devices that are axially separable when the control module is pulled out of the cavity and which coupling devices drivably engage with adequate torque carrying capacity when the control module is replaced, even if there is a slight lateral misalignment. The coupling devices likewise may be coupled together without adjusting relative rotational position.

The zero and span potentiometers thus do not have to be aligned carefully with the control shafts, and the settings of the zero and span potentiometers do not substantially change during reassembly if the module is removed for cleaning or other service. The coupling devices permit considerable lateral movement of the axes of the two parts and do not require any rotational alignment. The hook and loop fasteners also are operable across a significant range of spacing between the two parts while still transmitting torque. The pull strength of the coupling is not excessive so, when disassembled, the potentiometer soldered leads are not overstressed. Additionally, electrical contacts between the exterior terminals and the circuit on the control module are mated together to complete electrical connections at the time that the control module is inserted into the cavity and is secured in place.

The control module has a barrel assembly with at least one pressure input port thereon that communicates pressure with a port and conduit connection on a wall of the housing when the module is properly inserted. In most instances, there will be at least two conduits and ports that will be fluidly coupled to the control module, and the control module will have sealing means for isolating the fluid paths from each other. The control module is made to properly seat in the cavity for rapid replacement with the appropriate connection being made.

The control modules can be made into different operational configurations (different sensors or active elements and different circuitry) using the same outer housing and the same coupling or connecting elements that are mounted on the housing. The control module is inserted in direction along a central axis of the cavity bore and is seated in place with a threaded-on cover that also acts as a handle when the control module is to be removed, to aid in sliding the control module into and out of the cavity. The circuit used for the control module is preferably a known converter or transmitter circuit using two wires for coupling a D.C. current signal to remote locations.

DETAILED DESCRIPTION OF THE PREFERRED EMBODIMENTS

Figure 1:
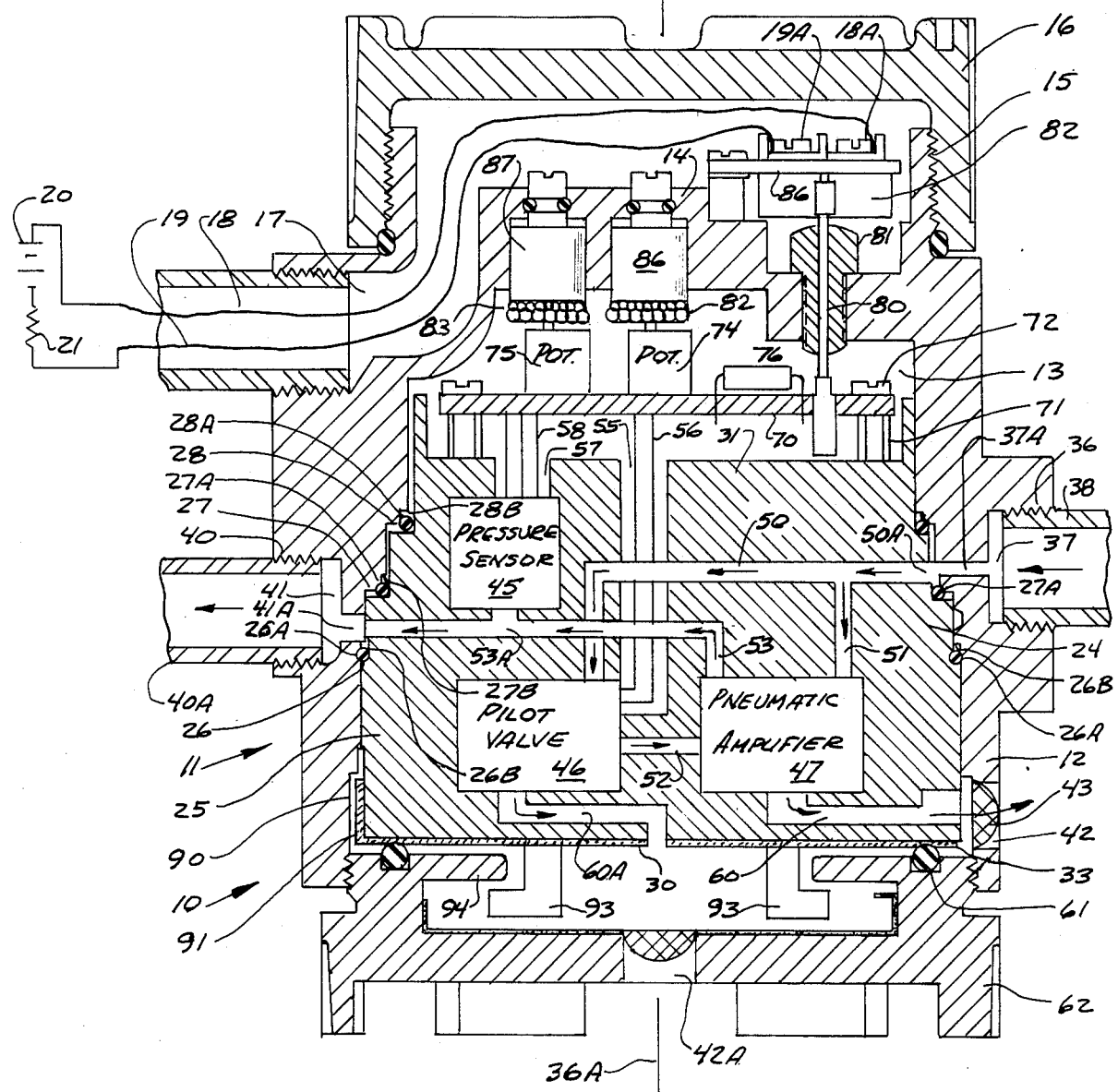
FIG. 1 is a vertical sectional view through a pressure instrument made according to the present invention showing a first form of control module installed therein.

In FIG. 1, a pressure instrument indicated generally at 10 comprises outer housing 11, which has a housing wall 12 that as shown defines a generally cylindrical interior cavity 13. The cavity is formed with a stepped internal surface formed by internal shoulders. The cavity 13 is closed by an end wall 14. The end wall 14 encloses the interior cavity 13. On a side of the wall 14 opposite from the cavity 13, a threaded neck 15 is formed on the housing, and a cover 16 is threaded in place on this neck to overlie the outer side of the wall 14, and permit access to external electrical connections as well as set point adjustments. In this form of the invention, a passageway 17 is provided out through the side of the housing on the exterior of wall 14 and through neck 15 for electrical conductors 18 and 19, comprising two wires carrying a two wire 4 to 20 mA current signal for the pressure instrument. The wires can then be connected to a suitable power source 20 and a load 21. The wires 18 and 19 are connected to terminal screws 18A and 19A, respectively, mounted on the exterior of end wall 14 and under the cover 16.

A control assembly or module 25 is shown mounted in the cavity 13. The control module 25 comprises control means and has a generally cylindrical barrel assembly 24 into which various pressure control or pressure sensing components can be mounted. The cross-sectional shape in the barrel assembly 24 is generally cylindrical to mate with the shape of the cavity 13. The barrel assembly 24 of the control module 25 has first, second and third annular shoulders 26, 27 and 28, respectively, formed thereon. The shoulders form shoulder surfaces that face inwardly toward the end wall 14 when the control module 25 is installed in the cavity 13. The shoulders reduce the outer diameter of the barrel assembly 24 from the control module base end indicated generally at 30 to a circuit board support end 31 of the barrel assembly. Each of the shoulder surfaces has an O-ring 26A, 27A and 28A, respectively, thereon, which will engage and seal against corresponding stepped internal surfaces that are formed on the interior of the cavity 13 by shoulder surfaces 26B, 27B and 28B. The O-rings 26A, 27A and 28A are spaced in axial direction along a generally central axis 36 of the control module 25, and the outer peripheral surface of the barrel assembly 24 fits closely with respect to the inner surface of the cavity 13 so that there is a sliding fit when the control module 25 is slipped into the cavity from the opening 33 at the end of the cavity opposite wall 14.

The housing wall 12 that surrounds the cavity 13 has at least one fluid supply passageway therein, and in most instances will have more than one. As shown in FIG. 1, a threaded opening 36 aligns with a port 37 that leads to a passageway 37A leading into the interior of the cavity 13. A conduit 38 is connected to the threaded connection 36 and leads from a suitable supply of fluid under pressure (not shown).

In FIG. 1, on a diametrically opposite side of the housing 11, there is a threaded connection 40 defined in the wall 12 that opens to a port 41 that connects to a passageway 41A passing through the wall 12 to open to the cavity 13. Additionally, in this form of the invention there is a vent opening 42 in the wall 12 near the opening 33 to the cavity 13, which vent is covered with a screen 43.

The barrel assembly 24 of the control module 25 has, in this form of the invention, several components and passageways formed therein. The components are shown schematically in FIG. 1. The components can be formed as desired and connected to various conduits as the barrel is built up in sections. The schematic showing is illustrative, and the barrel assembly can be made of a block of metal with the various bores formed therein and the components can be installed using a multipart or multisection barrel assembly. The outer surface of the barrel assembly 24 can be machined to form the shoulders and for a proper fit.

In this form of the invention, the control module 25 comprises control means forming a current-to-pressure (I/P) converter, and components that are mounted in the barrel assembly 24 as part of the control module include a pressure sensor 45 of conventional design, a pilot valve 46 that is used for receiving fluid under pressure and providing a pressure output signal in response to current that is carried to an element in the pilot valve, and a pneumatic booster amplifier 47 that receives a pressure signal from the pilot valve and amplifies it to provide an output pressure signal that will be received at the conduit 40A connected to the threaded connection 40.

A fluid supply passageway indicated generally at 50 has a port 50A opening to the passageway 37A aligning with the port 37. Port 50A is positioned between the O-rings 27A and 28A, so that it is isolated from other ports on the exterior surface of the barrel assembly 24. The passageway 50 is open to a suitable connection on the pilot valve 46, and also opens to the pneumatic amplifier through a branch passageway 51. The pilot valve 46 has an output passageway 52 leading from a suitable output signal port in the pilot valve, and passageway 52 opens to the control signal input port of the pneumatic amplifier 47. A passageway 53 is provided for carrying the fluidly amplified output flow from the pneumatic amplifier 47 to the pressure sensor 45, as can be seen, and also to a port 53A that opens to the exterior of the control module 25 between O-rings 27A and 26A, and aligns with the passageway 41A leading to port 41 and thus to the output conduit.

There is a passageway 55 in the barrel assembly 24 that opens at the circuit board end 31 of the barrel assembly and which has electrical input leads 56 extending therethrough to the pilot valve 46, to provide signals for control of the pilot valve 46. There is also another passageway 57 in the barrel assembly 24 that opens adjacent to the circuit board end 31 to carry electrical leads 58 to the pressure sensor 45 for carrying signals to and from the pressure sensor 45.

A vent passageway 60 is formed in the barrel assembly 24, and the vent passageway is open to a port that aligns with the vent 42 in wall 12. The vent passageway 60 is sealed by the O-ring 26A, and an O-ring 61 that bears against the base end 30 of the barrel assembly 24. The O-ring 61 is retained within a groove in a threaded cover 62 that threads onto the housing 11 to close opening 33 and which holds the control module 25 in position. The vent 42 carries bleed fluid for the pneumatic amplifier 47. A second vent passageway 60A carries bleed fluid from the pilot valve 46 to a second port 42A in cover 62.

The pressure sensor 45 can be any desired type of pressure sensor. The overall operation of the control means or control module 25 can be such as that described in U.S. Pat. No. 4,481,967 which is incorporated herein by reference. Additionally, the individual pneumatic amplifier 47 can be of the form shown in U.S. Pat. No. 4,653,523 which is incorporated herein by reference and the pilot valve can be formed, as a preferred embodiment, such as that shown in U.S. Pat. No. 4,638,830 which is incorporated herein by reference. These components are small enough so that they will fit into the barrel assembly 24. The components are for operation in the barrel assembly 24.

The circuit associated with the components comprising part of the control module used for providing a signal that is compatible with DC current signals along wires 18 and 19 can be mounted onto a circuit board indicated generally at 70 that is mounted on suitable standoffs 71 with mounting screws 72 to the circuit board end 31 of the barrel assembly 24 to form part of the control module or control means 25. The circuit board 70 contains various circuit components, including integrated circuits having amplifiers, resistors, and the like. The circuit used includes a zero adjustment potentiometer 74, that mounts on top of the circuit board 70, and a span adjustment potentiometer 75 that also mounts on top of the circuit board. Each potentiometer has a control shaft at the top end thereof. As seen typically in FIG. 3, the potentiometers are held on the board 70 with soldered lead joints. It can be seen that the circuit board 70 is supported adjacent the wall 14, and the potentiometer control shafts face toward the wall 14. Additionally, terminals or sockets indicated at 76 are formed for carrying DC current signals between the transmitter circuit and lines 18 and 19. While only one terminal 76 is shown, there are two such output terminals 76 that are positioned side-by-side.

The potentiometers 74 and 75 must be capable of being adjusted from the exterior of cavity 13 without permitting the atmosphere in which the pressure instrument is being used from ventilating the cavity, so that explosion-proofing is possible. The leads from the terminals 76 also have to be sealed for explosion-proofing. A feedthrough connection comprising a conductor or pin 80 supported in a suitable feed through bushing 81 is mounted in alignment with each terminal 76. The conductor 80 feeds power to terminals on a support block 82 on the exterior of wall 14. The end of each conductor 80 forms a contact that mates inside a socket on the end of a receptive terminal 76 to form an electrical connection to the terminals 76 on the circuit board and to the screws 19A and 18A, respectively, for connection to the external wires 18 and 19. The connections to the circuit board in the cavity 13 thus are sealed from the exterior.

The potentiometer output shafts are drivably coupled to set point control shafts mounted on and accessible from the exterior of wall 14. Coupling means shown generally at 82 and 83, respectively, comprise interfitting hook and loop fasteners, with hook portions 83A and 83A each bonded onto flat plate-like members or discs 84 (see FIG. 3) that are drivably connected to the respective potentiometer control shaft, and the loop portions indicated at 83A and 83B are bonded to the ends of suitable set point control and adjustment shafts 86 and 87, respectively. The shafts 86 and 87 are rotatably mounted in suitable bores in the wall 14.

The axial length of the bores for the set point adjustment shafts 86 and 87 along the axis of rotation of the set point adjustment shafts and the close fit between the bore and the shaft provides for flame quenching for explosion-proofing.

The set point adjustment shafts 86 and 87 have cylindrical necks 86A and 87A that are smaller than the main portions of the shafts and which are rotatably mounted in through-bores in the wall 14. The necks extend to the exterior of the wall 14, underneath the cover 16. The necks 86A and 87A in turn have slotted heads accessible from the exterior of the wall 14. The heads can be formed as part of the necks, or they can be separate screws threaded into the necks. The heads are shown at 86B and 87B, respectively.

Suitable O-rings are also provided around the necks as shown at 86C and 87C for sealing purposes and also to provide a friction drag so that the set point adjustment shafts will not easily rotate, but can be rotated with screwdrivers for adjusting the potentiometer settings.

It can be seen that upon movement of the control module 25 axially away from the wall 14, the coupling means 82 and 83 will separate, and the contacts at the end of the conductors 85 will also separate from the respective terminal 76 so that the control module 25 can be pulled out of the cavity through the end opening 33.

In order to properly rotationally mount the control module 25, the interior surface of the cavity 13 has an index key slot 90 defined therein at the open end 31, adjacent the threaded connection with the cover 62, and an index key 91 will be fixed to the barrel assembly 24 so that the rotational position of the control module 25 and the housing will be maintained.

The barrel assembly 24 has a pair of lugs 93 on the lower end thereof that have overhanging lips, as shown, that form a receptacle between the bottom surface of the barrel assembly 24 and these lugs. The cover 61 in turn has at least part annular flanges 94 formed therein so that one of the lugs 93 and one of the flanges 94 will interfit with rotation of the cover 62. The threaded cover 62 can be used as a jackscrew to draw control module 25 out of cavity 13.

When operating a current-to-pressure converter such as that shown in FIG. 1, the fluid under pressure from the supply usually has some contaminants in it, and the parts that are operative then can become gummed up and the module can require replacement. Also, the circuit components on the circuit board 70 can require service. If the control module 25 becomes inoperative and merely has to be cleaned, then the control module 13 can be removed by screwing the cover 62 off and using it as a handle to lift the control module 25 out of the cavity 13. The control module 25 can be cleaned and then replaced. The potentiometers 74 and 75 do not have to be changed in setting and the coupling means 82 and 83 separate without rotating the controls for the potentiometers. The hook and loop fasteners have a favorable shear strength when coupled so there is good torque carrying capability, but the separation strength is not excessive when removing the control module so the soldered connections of the potentiometers are not overstressed. When the control module is reinserted into cavity 13, there is no need to move either the set point adjustment shafts 86 or 87 or the control shafts on the potentiometers for drivably coupling the two mating parts of each coupling means together. In other words, the coupling means will engage to form a drivable connection from the set point adjustment shafts 86 and 87 to the potentiometers without any rotational movement for alignment. There also is a significant range of permissible axial positions in direction along axis 36A in which the hook and loop fasteners will operatively engage so the seated position of the module can vary somewhat.

The passageways 37A and 41A do not require any rotational alignment with the passageways 50A and 53A.

Figure 2:
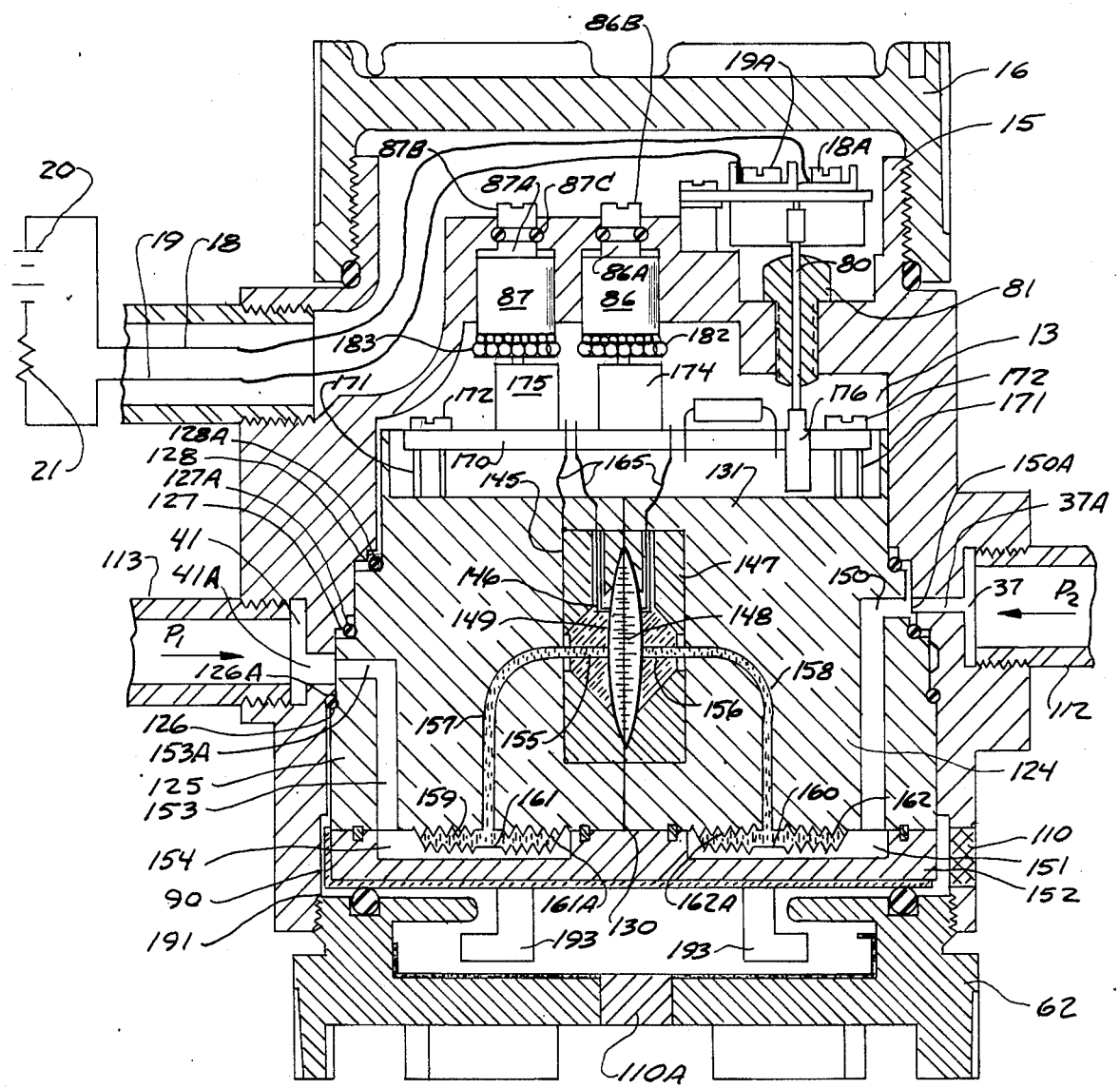
FIG. 2 is a sectional view of a second form of control module shown in the same outer housing as that illustrated in FIG. 1.

In FIG. 2, a modified form of the invention is illustrated, utilizing precisely the same outer housing 11, which has been numbered accordingly, with the exception that the vent openings 42, 42A can be blocked. For purposes of illustration and for uniformity of numbering, the vent openings are shown with suitable closing plugs 110, 110A that make the wall 12 and cover 62 continuous and hermetically seal the vent openings. However, in this form of the invention the control module includes a differential pressure sensor, which of course has different components, for providing a 4 to 20 mA output signal along the two wires 18 and 19 in a two-wire transmitter arrangement. The control module of this form of the invention fits into the cavity 13 of the outer housing 11 and connects to the necessary pressure ports for operation.

In this form of the invention, the input conduit at the port 36 comprises a conduit 112 that leads to a source of fluid under pressure designated P2 in FIG. 2, and the conduit 40A is replaced with a conduit 113 that leads to a source of fluid under pressure designated P1. The sources of fluid under pressure connected to conduits 112 and 113 are different sources, and the differential in pressure between these sources is the parameter to be sensed.

In FIG. 2, the sensor module 125, comprising sensor means, has an outer configuration substantially indentical to that which was described earlier, and comprises a generally cylindrical outer barrel 124, with a first shoulder 126, a second shoulder 127, and a third shoulder 128 that form steps in diameter (getting smaller in diameter in direction from the base end 130 to the circuit board support end 131). Each of the shoulder surfaces 126, 127 and 128 has an O-ring 126A, 127A and 128A thereon for sealing against mating internal shoulder surfaces formed on the interior surface that defines cavity 13.

In this form of the invention, a differential pressure sensor 145 forms the sensor module. The sensor is shown schematically and comprises a diaphragm member 146 mounted in an outer housing 147 that is constructed according to known principles, as shown in U.S. Pat. No. 4,370,890 incorporated herein by reference, for example. Diaphragm member 146 is supported at its outer edges by the housing, in a known manner, and is mounted in a central chamber in the housing. The diaphragm 146 divides the central chamber into two portions, and acts as a common capacitor plate relative to capacitor plates 148 and 149 which are formed by depositing layers of suitable materials onto the surfaces of the chamber. The sensor components can be manufactured separately and then placed into the barrel assembly. The barrel assembly 124 is also made in sections for ease of assembly.

An input passageway 150 in barrel assembly 124 has a port 150A that aligns with a port 37, and the passageway 37A leading from the port 37 so that the pressure P2 will be admitted to the passageway 150. The passageway 150 opens into a chamber 151 which is formed in a cap 152 that forms an end portion of the barrel 124. Another passageway 153 is formed in the barrel 124 of sensing module 125, and passageway 153 has a port 153A that aligns with the port 141 in the housing wall 12 and carries the pressure P1 to the passageway 153. The passageway 153 opens to a second chamber 154 which is fluidly separated from and sealed from the chamber 151.

The chambers formed in the sensing module housing 147 on opposite sides of the sensing diaphragm 146 connect to passageways 155 and 156 in the housing 147, which are coupled to passageways 157 and 158 formed in the barrel assembly 124. The passageways 157 and 158 open to isolator chambers 159 and 160 which are defined by isolator diaphragms 161 and 162 and portions 161A and 162A of the end of the barrel assembly 24. The isolator diaphragms are flexible diaphragms also formed in a known manner and sealed around their edges to form the chambers 159 and 160. The chambers 159 and 160, and the connected passageways 157,158 and 155,156, as well as the chambers in housing 147 on opposite sides of the diaphragm 146 are filled with a substantially noncompressible fluid, such as a silicone oil, so that any deflections of the isolator diaphragms will cause a proportional or corresponding deflection of the sensing diaphragm 146. Differentials in pressure between chambers 151 and 154 will cause the isolator diaphragms to deflect and deflect the sensing diaphragm 146. The resulting deflection of the sensing diaphragm 146 is sensed with suitable capacitance sensing circuitry. The sensed signals are carried on leads 165 that pass through the barrel assembly 124 of the sensing module 125 to the exterior of the barrel assembly adjacent the circuit board mounting end 131. Differentials in pressure will be sensed in a known manner.

In this form of the invention a circuit board 170 is supported on standoffs 171 and held in place with screws 172. Suitable circuitry is mounted on the circuit board including circuit components comprising a zero adjustment potentiometer 174 and a span adjustment pot potentiometer 175. The circuit board has terminals 176 thereon for connection to conductors leading to remote components.

Coupling means 182 and 183 are used for coupling the control shafts of the potentiometers to the set point adjustment and control shafts 86 and 87, respectively, which fit into the wall 14 of the housing 11.

The terminals 176 also receive the conductors 80 of the signal feedthroughs for making the connections from the circuit on the circuit board 170 to the wires 18 and 19.

In this form of the invention, the cap 152 in which the pressure chambers 151 and 154 are formed can be suitably welded or sealingly fixed onto the main portion of the barrel assembly 124. The cap 152 has lugs 193 thereon that are identically constructed to lugs 93, for mating with the flange 94 of the cover 62, so that the control module 125 can be removed by using the cover 62 as a handle in the same manner as with the first form of the invention. An index key 191 is made to fit into the index key slot 90 in the housing 11 so that the coupling means 182 and 183 and terminals 176 and pins 80 are properly oriented for coupling.

In this form of the invention, again, if there is any service that needs to be performed on the control module or control means 125, loosening the cap 62 and lifting the control module out of the cavity 13 provides for separation of the zero and span potentiometer control shafts from the manually operable set point adjustment shafts 86 and 87 by release of the coupling means 182 and 183. Separation of the terminals 176 from the conductors that engage the terminals is also accomplished as the module is removed through the end opening 33 of the housing 11.

Thus, in both forms of the invention, the control means, comprising the control module 125, can easily be disengaged from the set point adjustment and control shafts, the conductors that connect to the circuit board on the sensing module and the conduits which supply pressure. Reconnecting also is easy with the coupling means shown because the mating components do not have to be rotationally aligned to a specific orientation (as a slotted connection might), and also there can be some lateral misalignment, as well, without affecting the recoupling and driving of the potentiometers. The barrel assembly 124 has the external shoulders that provide for mounting seals to isolate the respective pressure inputs from other pressure signals and provide for normal operation of a differential pressure module.

Figure 3:
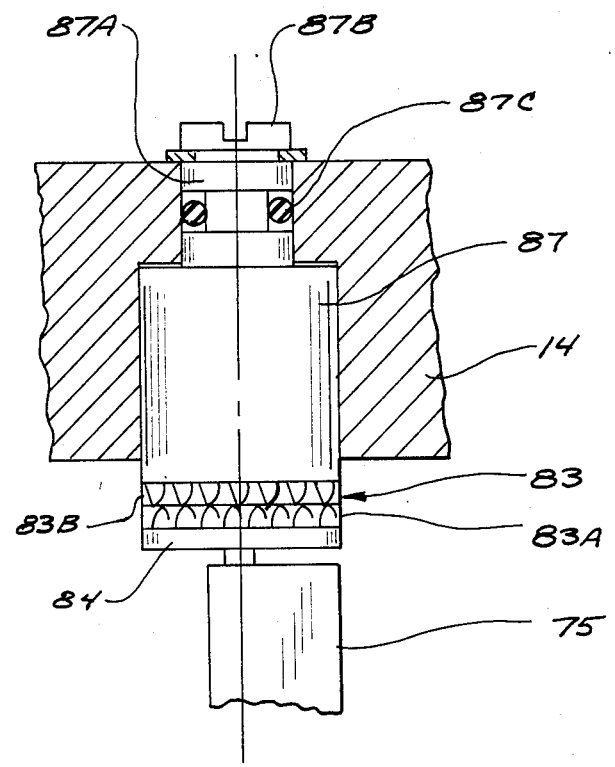
FIG. 3 is an enlarged side view of a drive coupling between an adjustment shaft and a potentiometer used with the control modules shown in FIGS. 2 and 3.

FIG. 3 is an enlarged view of a typical potentiometer and the coupling means, and illustrates that the two members of the coupling means can easily be placed together. One coupling portion is a disc 84 drivably mounted onto a control shaft of the respective potentiometer while the other coupling portion is being driven by the adjusting set point adjustment and control shaft 87 that is rotatably mounted in the wall 14 and accessible from outside the interior cavity 13.

The hook and loop fasteners are usually made of nylon and are inert to a wide range of chemicals. A Velcro brand hook and loop fastener manufactured by Velcro USA Inc. in Manchester, N.H. can be used. Axial position tolerance without loss of the driving connection is good, because the loops and hook will compress to accomodate position differences. Also, vibration tends to make the hooks dig into the loops, so vibration does not adversely affect operation. Reasonable axial offset can be tolerated and the bottom surface of the set point adjustment shafts and the disc do not have to be precisely parallel. The hook and loop fasteners are low cost as well and thus are well-suited for this coupling.

The housing 11 is explosion-proof, that is, capable of being used where atmosphere may be ignited or which may burst into flame in the presence of a spark. The electrical circuitry, which can spark and cause ignition under fault conditions, is in a sealed cavity. If the circuitry fails and causes a spark, and the atmosphere within the sealed cavity ignites, the flame is contained in the sealed cavity to prevent a large explosion in the plant in which the instrument is used. If a flame starts in the cavity 13 in the portion where the circuit board is mounted, the flame has to travel along a substantial length of a narrow path between the control module and the surface defining the interior cavity to exit the cavity, or it must exit between the control shafts for driving the potentiometers and the bores in the cavity. The clearance for the control shafts is very small and flame is choked out before it travels very far. The "O"-rings on the control shafts also seal the space around the shafts so substantially no flow of gas is permitted. The flame path from the circuit board end of the control module to the base end has a substantial length to travel before it even reaches the shoulders 28 or 128, and has to travel much further before it can be discharge out of the cavity. The "O"-rings on the control module seal also seal to prevent gas flow between the barrel assembly and the interior surface of the cavity. Likewise, the bores for housing the set point adjustment shafts 86 and 87 provide for a substantial length of travel for any flame that is going to escape out through the wall 14. This length of travel of the flame causes the flame to be cooled and quenched before it escapes. Thus, the flame does not leave the sealed cavity, and satisfactory operation for explosion-proof rating is assured. The axial movement for removal of the control module makes service or replacement simple. The drive from the set point adjustment and control shafts 86 and 87 to the respective potentiometer is through easily coupled drives that transmit sufficient torque and which do not require precise alignment.

Although the present invention has been described with reference to preferred embodiments, workers skilled in the art will recognize that changes may be made in form and detail without departing from the spirit and scope of the invention.

What is claimed is:

1. A pressure instrument providing an adjustable control function between a fluid pressure in a conduit and a signal on a line, comprising:
    a housing having a wall surrounding a cavity in the housing, the wall having a port therethrough connected to the conduit, the wall further having a bore therethrough;
    a shaft sealingly disposed in the bore and having a portion opening into the cavity;
    control means removably inserted in the cavity and coupled to the line and the port, the control means having an adjustment input with a set point; and
    coupling means disposed between the shaft and the adjustment input for removably coupling the shaft to the adjustment input such that the control means can be inserted in the cavity of the housing without separately aligning the adjustment input relative to the shaft.

2. The pressure instrument of claim 1 wherein the coupling means comprise a hook and loop coupling having two portions which can be engaged and disengaged without adjusting the adjustment input.

3. The pressure instrument of claim 2 wherein the conduit is connected to the port on the exterior of the housing and the control means is removable from the housing without disconnecting the conduit from the port.

4. The pressure instrument of claim 3 further comprising a feedthrough conductor disposed through the wall for coupling between the line and control means such that the control means is removable from the housing without disconnecting the line from the feedthrough conductor.

5. The pressure instrument of claim 4 wherein the control means includes means for providing a current-to-pressure conversion control function, the wall having a second port therethrough connectable to a supply conduit providing a supply of pressurized fluid to the control means, and wherein the control means is removable from the housing without disconnecting the supply conduit.

6. The pressure instrument of claim 4 wherein the control means further comprise a differential pressure transmitter, the wall having a second port therethrough connectable to a second conduit for providing a second pressure to the control means, and wherein the control means is removable from the housing without disconnecting the second conduit coupled to the second port.

7. A pressure instrument for providing an adjustable output as a function of the pressure of a fluid under pressure in a conduit, comprising:
    a housing having a wall defining a cavity, said wall having a first passageway therethrough for connection to the conduit carrying fluid under pressure, and an access opening in said housing leading to said cavity;
    a control module adapted to fit through said access opening into said cavity and having a seated position, said control module having a second passageway communicating with the first passageway through the wall when the control module is in its seated position in the cavity, said control module including at least one first component for receiving fluid pressure from the second passageway, said control module further having seal means thereon for sealingly connecting the first and second passageways; and
    a cover disposed over the access opening and having means mechanically coupling the cover to the control module, said cover being rotatable relative to the housing to draw the control module out of the cavity by the means mechanically coupling.

8. The apparatus as specified in claim 7 wherein said cavity has separate peripheral internal shoulder means at two locations spaced in direction along the axis, said module having external shoulder means that mate with and face the internal shoulder means when the control module is in its seated position in the cavity, said sealing means being positioned to seal on the mating shoulder means, and the passageways opening between the separate shoulder means.

9. The apparatus as specified in claim 7 wherein said control module comprises a differential pressure sensor, and wherein said housing wall has two conduit inlet ports connectable to different pressure sources, the control module having passageways defined therein, one leading from each of the ports for admitting two separate fluids under pressure to the differential pressure sensor.

10. A replaceable control module for a pressure instrument providing an adjustable output and for receiving a pressure input, said control module having a central axis, an outer peripheral surface surrounding the central axis, and having a first end, said control module being adapted to fit into a cavity of a housing, and having a seated position in such housing, said control module having a fluid passageway opening to a port on the outer peripheral surface thereof and including at least one component for receiving fluid pressure from the fluid passageway;

circuit means carried at the first end of the control module, including a rotatable set point control means; and an axially disengageable and engageable coupling portion mounted on said rotatable set point control means, the coupling portion being adapted to drivably engage a mating coupling portion for rotational drive upon axial movement of the control module, and the port being adapted to sealingly mate with an input pressure port of a housing when the control module is in a seated position in a cavity of such a housing.

11. The control module of claim 10 wherein said circuit means includes electrical connection means that is engageable and disengageable with respect to mating electrical connection means upon movement of said control module in direction along its central axis.

12. The control module of claim 10 and seal means carried on the peripheral surface of said control module to isolate said port with respect to a mating wall of a housing defining a cavity in which the control module is adapted to fit.

13. The control module of claim 10, wherein the outer peripheral surface forms shoulder portions so the size of the module decreases in direction along the central axis toward the first end.

14. The control module as specified in claim 10, wherein said circuit means comprises a circuit board mounted at the first end of the control module and extending generally laterally with respect to the central axis.

15. The control module of claim 10 wherein said coupling portion comprises one of a hook portion and a loop portion of a hook and loop fastener.

16. A pressure instrument for providing an adjustable output as a function of the pressure of a fluid under pressure in a conduit, comprising:

a housing having a wall defining a cavity, having a central axis, said wall having a first passageway therethrough for connection to the conduit carrying fluid under pressure, and an access opening in said housing leading to said cavity, said opening being centered on the central axis and said cavity having inner end wall means opposite from the access opening;

a control module adapted to fit through said access opening into said cavity and having a seated position, said control module having a second passageway communicating with the first passageway through the wall when the control module is in its seated position in the cavity, said control module including at least one first component for receiving fluid pressure from the second passageway, said control module further having seal means thereon for sealingly connecting the first and second passageways;

means for releasably holding the control module in the cavity; and means mounted on said inner end wall means accessible from an opposite side of said inner end wall means from said cavity and extending through said inner end wall means, said means mounted on said inner end wall means being in position to engage and operatively couple to at least one electrical component on said control module.

17. The apparatus as specified in claim 16 wherein said electrical component on said module comprises a rotationally adjustable potentiometer, and at least one of the means mounted on said inner end wall means including rotatable adjustment means accessible from the opposite side of said inner end wall and drivably coupled to said rotationally adjustable potentiometer when the control module is seated in the cavity.

* * * * *

UNITED STATES PATENT AND TRADEMARK OFFICE
CERTIFICATE OF CORRECTION

PATENT NO. : 4,760,859

DATED : August 2, 1988

INVENTOR(S) : Gregory C. Brown

It is certified that error appears in the above-identified patent and that said Letters Patent is hereby corrected as shown below:

On the front page of the patent, in the References Cited section, please insert the following references under U.S. PATENT DOCUMENTS:

-- 4,370,890   2/1983    Frick......................73/718
   4,638,830   1/1987    Brown et al. ..............137/83
   4,481,967   11/1984   Frick......................137/85
   4,653,523   3/1987    Brown......................137/85
   3,143,895   7/1962    N. P. Robie................74/229
   3,240,304   3/1966    W. Wickersham..............192/56
   3,522,681   8/1970    G. Lampert.................51/358
   3,617,426   11/1971   R. V. Grundman.............161/42
   3,718,009   2/1973    Perina.....................64/28R
   3,654,777   4/1972    Grundman...................64/30
   4,464,142   8/1984    Bridges et al. ............464/92 --

Column 5, line 37, after "at", delete "83A and".

UNITED STATES PATENT AND TRADEMARK OFFICE
CERTIFICATE OF CORRECTION

PATENT NO. : 4,760,859

DATED : August 2, 1988

INVENTOR(S) : Gregory C. Brown

It is certified that error appears in the above-identified patent and that said Letters Patent is hereby corrected as shown below:

Column 7, lines 11-12, delete "indentical" and insert --identical--.

Column 9, line 41, delete "discharge" and insert --discharged--.

Signed and Sealed this

Eleventh Day of July, 1989

*Attest:*

DONALD J. QUIGG

*Attesting Officer*       *Commissioner of Patents and Trademarks*